US005421203A

United States Patent [19]

Graff et al.

[11] Patent Number: 5,421,203

[45] Date of Patent: Jun. 6, 1995

[54] MODIFIABLE ELECTRODYNAMIC ULTRASONIC TRANSDUCER

[75] Inventors: Alfred Graff, Essen; Gert Fischer, Wachtendonk; Hans-Jürgen Rohde, Duisburg, all of Germany

[73] Assignee: Mannesmann Aktiengesellschaft, Dusseldorf, Germany

[21] Appl. No.: 191,764

[22] Filed: Feb. 4, 1994

Related U.S. Application Data

[63] Continuation of Ser. No. 916,657, Jul. 20, 1992, abandoned.

[30] Foreign Application Priority Data

Jul. 18, 1991 [DE] Germany ........................ 41 24 103.7

[51] Int. Cl.[6] .............................................. G01N 29/04

[52] U.S. Cl. ...................................................... 73/643

[58] Field of Search .................. 73/643, 632; 367/140; 324/207.15

[56] References Cited

U.S. PATENT DOCUMENTS 3,697,867 10/1972 Kleesattel ............................ 73/643
4,268,771 5/1981 Lace .............................. 324/207.15
4,314,479 2/1982 Spijkerman .......................... 73/643
5,148,414 9/1992 Graff et al. ......................... 367/140
5,164,921 11/1992 Graff et al. .......................... 73/643

OTHER PUBLICATIONS

G. J. Parkinson et al., "Non-Contact Ultrasonics" Aug. 1977, pp. 178–184.

*Primary Examiner*—Hezron E. Williams
*Assistant Examiner*—Nashmiya Ashraf
*Attorney, Agent, or Firm*—Cohen, Pontani, Lieberman, Pavane

[57] ABSTRACT

An electrodynamic ultrasonic transducer includes a housing to be placed against a workpiece surface to be tested. A magnet system is arranged in the housing in the vicinity of the workpiece surface to be tested. A transducer coil system is arranged between the magnet system and the workpiece surface. The housing is of a non-magnetic, electrically conducting material, and the housing wall has, in a region receiving the magnet system, segment-like recesses. Circuit closing plates are removably mounted in the recesses for ensuring a magnetic flux between the workpiece surface and the magnet system.

13 Claims, 5 Drawing Sheets

MODIFIABLE ELECTRODYNAMIC ULTRASONIC TRANSDUCER

This is a continuation of U.S. application Ser. No. 07/916,657, filed Jul. 20, 1992, now abandoned.

BACKGROUND OF THE INVENTION

1. Field of the Invention

The present invention relates to an electrodynamic ultrasonic transducer including a housing to be placed against a workpiece surface to be tested and a magnet system arranged in the vicinity of the workpiece surface to be tested. The transducer further includes a transducer coil system arranged between the magnet system and the workpiece surface to be tested.

2. Description of the Related Art

Electrodynamic ultrasonic transducers are used in non-destructive ultrasonic material testing. In operation of electrodynamic ultrasonic transducers, the ultrasound is produced in the workpiece to be tested by eddy current induction through a magnetic field and a transducer coil which essentially acts as an antenna. Accordingly, the ultrasound is produced only in the workpiece surface to be tested itself and not already in the ultrasonic transducer, as is the case in piezoelectric ultrasound production. For this reason, the use of ultrasonic coupling means between transducer and workpiece surface is unnecessary in electrodynamic ultrasound production.

An electrodynamic ultrasonic transducer of the above-described type is known from DE 40 16 740 C1. This electrodynamic ultrasonic transducer is now used in automated ultrasonic testing, as well as in ultrasonic testing conducted manually. This known electrodynamic ultrasonic transducer is of very compact construction, so that the device is suitable as a hand-held test device and can be mounted individually in a large testing plant which has a plurality of such testing devices.

In the known electrodynamic ultrasonic transducer, the entire magnet arrangement is fixed because of the geometry of the transducer. The sound incidence direction of the ultrasonic waves generally depends on the geometric configuration of the magnets and, more significantly, on the geometric configuration of the coils. Since, in addition to testing a wall thickness, volumetric testing and testing for internal defects and surface defects are important, the magnet arrangement and coil geometry must be adapted to each other. Also, wave modes of different polarization which are adjusted to the desired testing task require an adaptation or change of the coil geometry and possibly of the magnet geometry. While the adaptation of the ultrasonic transducer to different coil geometries is possible in this known ultrasonic transducer, the adaptation is difficult and complicated.

When the ultrasonic transducer is used mounted individually in a large testing plant as mentioned above, depending on the type of testing plant there are large distances between the ultrasonic transducer and a central electronic control unit. However, the use of an electronic unit at the test site on the ultrasonic transducer itself is not possible in this known ultrasonic transducer under difficult conditions of operation, for example, at higher temperatures. The construction of the known electrodynamic ultrasonic transducer requires that the temperature of operation, i.e., essentially the temperature of the workpiece to be tested, is not greater than about 80° C. The known ultrasonic transducer makes possible the electrodynamic production of ultrasound in a very advantageous compact manner, however, the transducer is not suitable for a simple and quick rearrangement of the magnet geometry and the coil geometry and cannot be easily used over large distances between the transducer and the electronic control unit and at high temperatures.

SUMMARY OF THE INVENTION

Therefore, it is the object of the present invention to further develop an electrodynamic ultrasonic transducer of the above-described type in such a way that an adaptation or rearrangement of the ultrasonic transducer in accordance with the desired situation of use is possible in a simple manner even at high temperatures and large distances between the transducer and the electronic control unit.

In accordance with the present invention, in an electrodynamic ultrasonic transducer of the above-described type, the housing is of a non-magnetic material and the housing wall has over portions thereof recesses in the area of the magnet system arranged within the housing, wherein circuit closing plates or return plates of magnetic material are arranged within the recesses in order to ensure a magnetic return flux between the workpiece surface and the magnet system.

The significant advantage of the present invention is the fact that the housing is of non-magnetic material and the circuit closing member is essentially segment-shaped. The non-magnetic but electrically conducting material of the housing makes possible an integrated mounting of an electronic signal amplification unit in a very simple manner, wherein the housing itself effects screening of the integrated electronic unit against strong magnetic and electromagnetic fields, so that the arrangement of a separate screening cage is unnecessary.

The housing of the transducer has a rectangular shape in cross-section, and the circuit closing plates are arranged on the housing opposite each other. When the circuit closing plates are removed, the magnet system and transducer coil support are accessible. The magnet system as well as the coil system can be exchanged or reassembled. After the ultrasonic transducer has been assembled, the outer geometric configuration thereof remains unchanged.

Since the integrated electronic signal amplification unit is mounted in an advantageously simple manner in the housing of the ultrasonic transducer, it is possible to process the received signals at the test location, so that they can be transmitted through a cable over large distances to a central electronic control and evaluating unit without transmission errors. Of course, the possibility of integration is not limited to an electronic amplification unit, but it is possible to integrate any electronic structural groups. The important aspect is that the ultrasonic transducer remains small and compact.

The use of an integrated electronic unit becomes possible by the arrangement of cooling ducts within the housing in the wall region thereof, wherein coolant flows around the electronic unit, as well as the magnet system, so that the ultrasonic transducer can be used in any situation, i.e., also at high temperatures of the workpiece to be tested. The cooling system is fed in a simple manner by compressed air which can be supplied through the housing and ventilated through the support of the transducer coil system.

The magnet system includes at least two permanent magnets, wherein the pole surfaces of equal polarities of the magnets face each other. This magnetic system can be easily mounted in the ultrasonic transducer. The magnet system further includes an exchangeable concentrator member, so that, depending on the geometric configuration of the coil, the magnet system can be adapted in an optimum manner to the coil geometry and, thus, an optimum ultrasound production can be obtained, depending on the type of operation.

In accordance with an advantageous further development of the invention, the housing of the transducer has a cover in which the coolant connection as well as the coolant lines connected to the remaining coolant ducts are integrated. This makes possible a modular construction, so that, after the entire ultrasonic transducer has been assembled, the coolant lines and ducts are directly connected to each other, without requiting additional coolant ducts or lines in the housing. Thus, all ducts which conduct coolant are integrated in the individual components, such as housing, circuit closing plates, and transducer coil support, so that after the ultrasonic transducer has been assembled, a continuous connection for the coolant exists between all cooling ducts and the coolant connection.

In accordance with another advantageous further development of the invention, the components of he integrated electronic unit are mounted on different levels in the housing, wherein at least the level of the electronic unit which is closest to the cover is mechanically connected to the cover. This arrangement facilitates the maintenance of the transducer. Thus, it is possible to work on the electronic unit in case of a problem by simply unscrewing the cover and, after the cover has been removed, the uppermost level of the electronic unit is lifted out, and all structural components of the electronic unit are accessible for repair.

Finally, another advantageous feature of the present invention provides that the longitudinal edges of the ultrasonic transducer next to the workpiece are beveled in the region of the circuit closing plates and of the transducer coil support, so that, when the ultrasonic transducer "adheres" to the workpiece because of the high magnetic forces, the ultrasonic transducer can be separated easily from the workpiece by tilting it over the beveled portions.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there is illustrated and described a preferred embodiment of the invention.

DESCRIPTION OF THE PREFERRED EMBODIMENT

Figure 1:
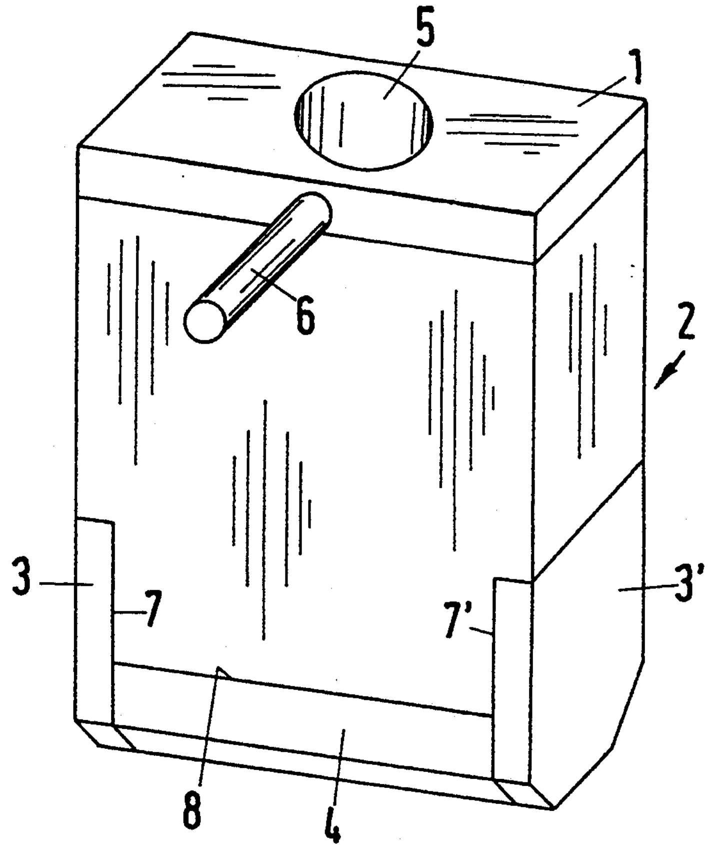
FIG. 1 is a perspective view of the housing of the electrodynamic ultrasonic transducer according to the present invention.

FIG. 1 of the drawing shows the outer shape of the housing 2 in which a cross section extending parallel to the test surface to be tested results in a rectangular cross section. Circuit closing plates 3, 3' are mounted in recesses 7, 7' of the housing 2 and are shaped in such a way that an outwardly flush surface of the ultrasonic transducer is obtained. This configuration is always an advantage during the assembly when the ultrasonic transducer is used in a complicated test plant.

The transducer coil support 4 is also constructed in such a way that it is arranged flush between the circuit closing plates 3, 3' in an opening 8 of the housing 2, so that the entire surface of the transducer housing 2 is flush. A cover 1 is provided with an opening 5 for receiving an electrical connection. The coolant connection 6 is also mounted on the cover 1.

Figure 2:
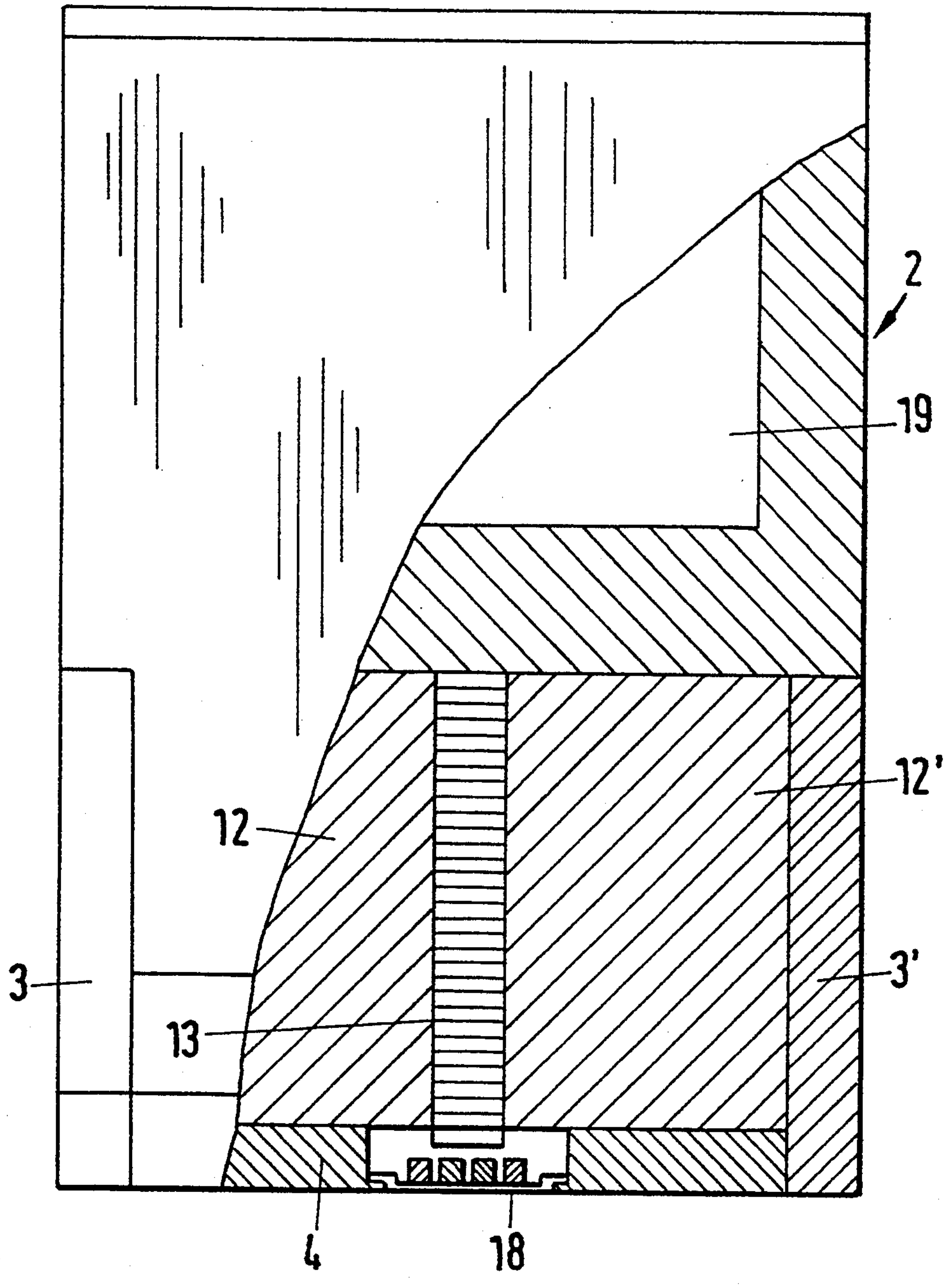
FIG. 2 is a partial sectional view of the housing showing a round coil system.
Figure 4:
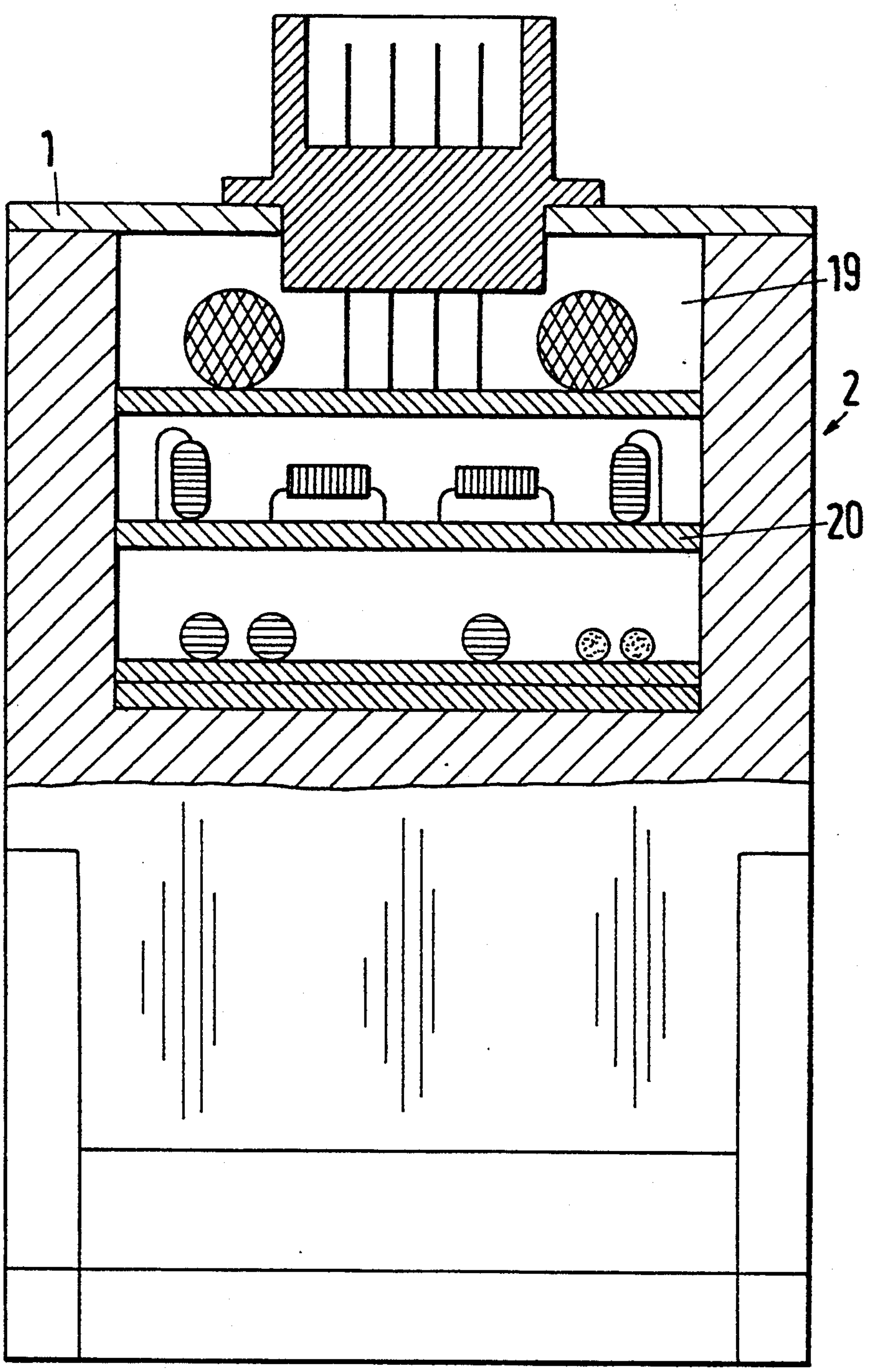
FIG. 4 is a sectional view of the ultrasonic transducer showing the electronic unit.

FIG. 2 of the drawing is a partial view of the housing 2 of the ultrasonic transducer which also shows the internal configuration thereof. The upper part of the housing has a recess 19 in which the electronic unit 20 can be mounted, as shown in FIG. 4. The housing proper is of a non-magnetic but electrically conducting material, so that a good screening always takes place during tests against externally occurring strong fields. The circuit closing plates 3, 3' form a closed magnetic circuit together with magnets 12, 12' and a, concentrator member 13. When the ultrasonic transducer is placed against the workpiece surface, the magnetic flux lines of the magnetic circuit emerge from the concentrator member 13 in the direction of the transducer coils 18, penetrate the workpiece, and are then returned to the magnets through the circuit closing plates 3, 3'.

Figure 3:
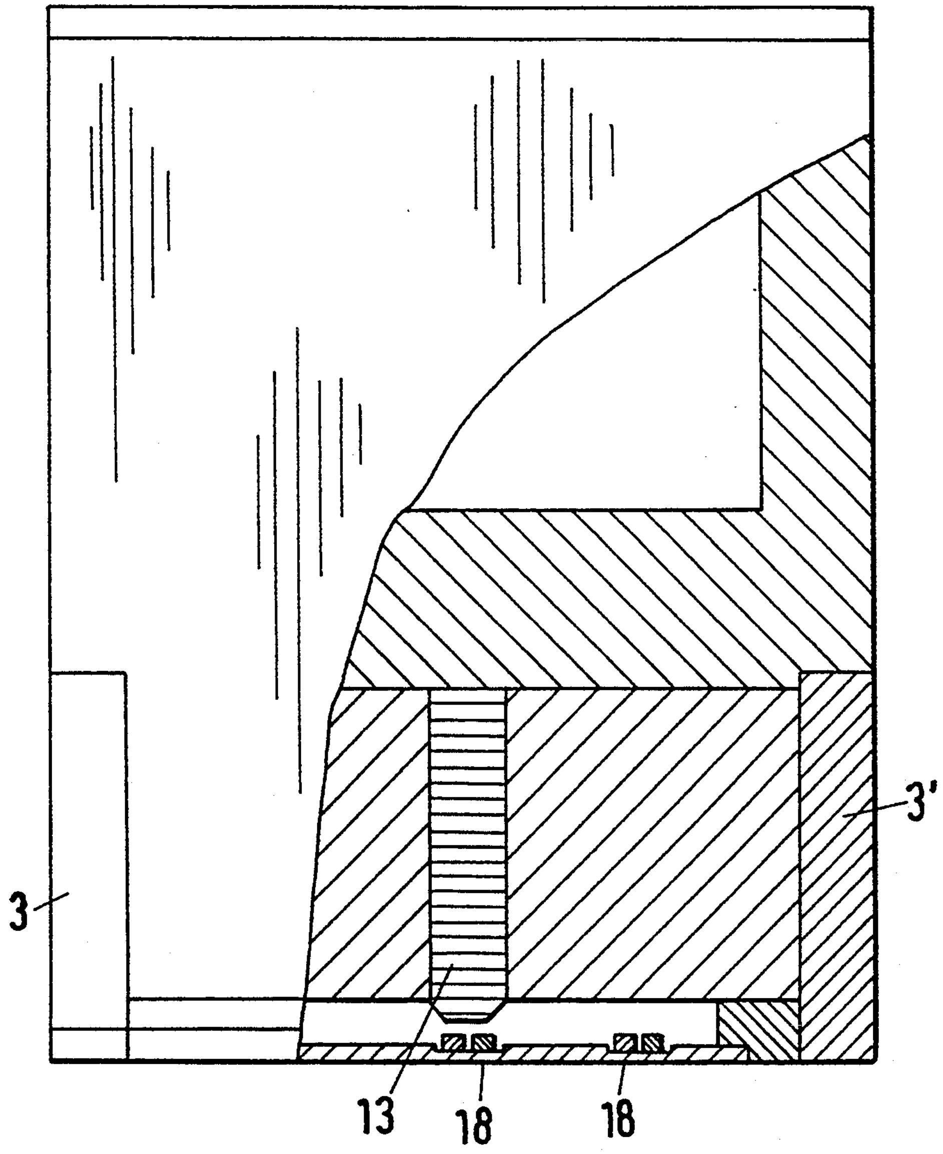
FIG. 3 is a partial sectional view of the housing showing a line element transducer coil system.

FIG. 3 of the drawing shows the use of the electrodynamic ultrasonic transducer with a type of transducer coil 18 which is called a line element transducer system. In this case, where the concentrator member 13 of the magnet system has a particular construction, i.e., at the location where the magnetic flux line emerges, the concentrator member 13 conically narrows toward the coil system. The circuit closing plates 3, 3' are removable in order to provide access to the magnet system, wherein either only the concentrator member 13 is exchangeable or the concentrator member and the magnets 12, 12' are exchangeable.

The dimensions of the coil support 4 are such that the various transducer systems can be accommodated therein without changing the outer dimensions of the coil support. Accordingly, the ultrasonic transducer has, after a reassembly, the same outer housing dimensions as before the reassembly.

FIG. 4 of the drawing shows in detail a possibility of mounting an electronic signal amplification unit 20 within the housing 2 of the ultrasonic transducer. Accordingly, the signal can be processed already at the test location, so that the processed signal can be transmitted without errors over large distances to a central electronic control unit. Since the housing is of a non-magnetic but electrically conducting material, a good screening effect is obtained and additional screening elements, such as a screening cage or the like, are not necessary.

As can be seen in FIG. 4, the components of the electronic unit 20 are arranged in levels. This configuration can be realized by means of electric connections for providing the electric contacts between levels. Because of the mechanical connection with the cover 1 of the level located closest to the cover 1, the configuration is simple to maintain because, after removal of the cover, all electronic structural groups are immediately separated and, consequently, accessible.

Figure 5:
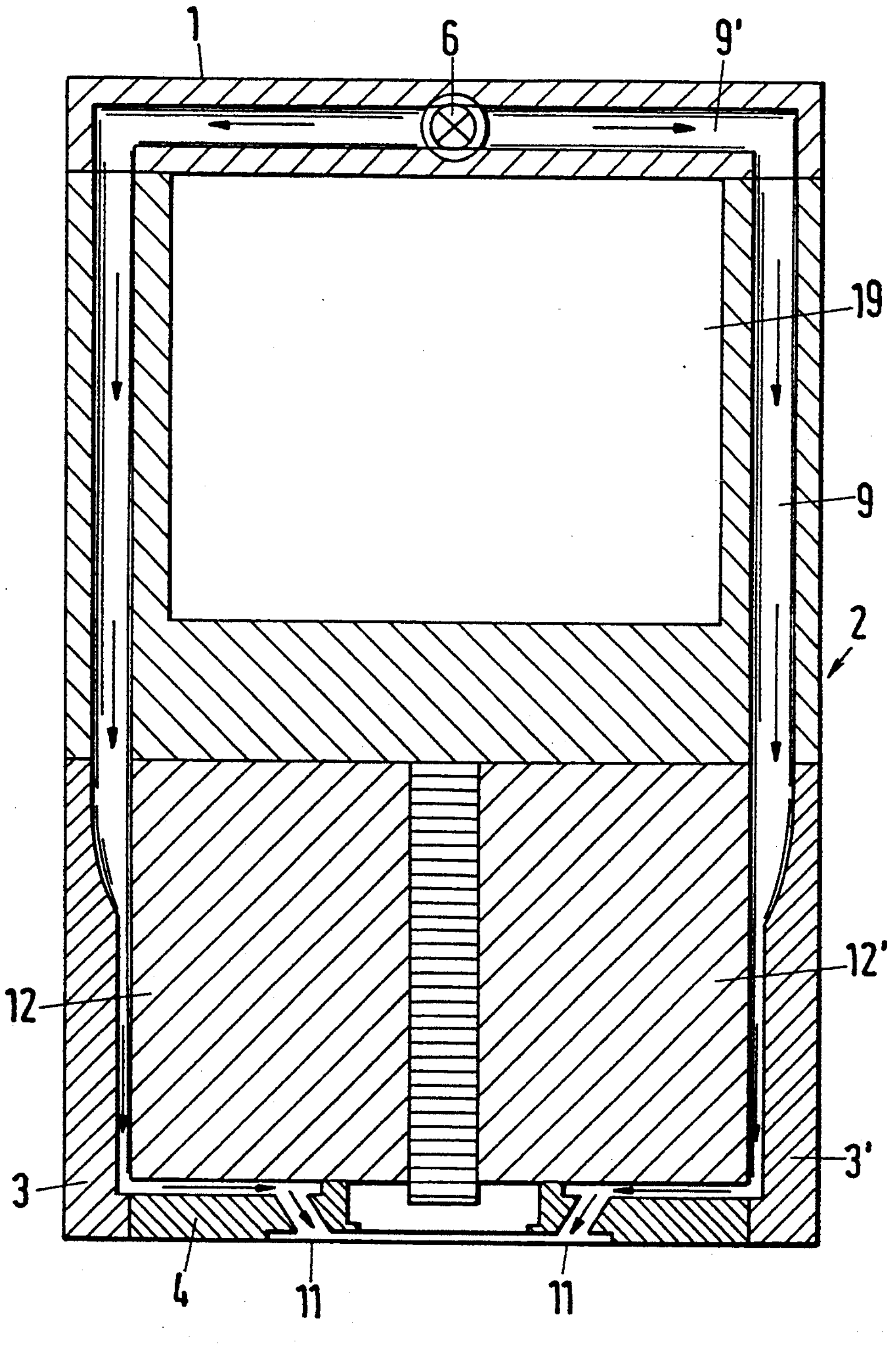
FIG. 5 is a sectional view of the ultrasonic transducer showing the cooling ducts.

FIG. 5 of the drawing shows the arrangement of cooling ducts 9 which make it possible to use an integrated electronic unit 20 also at higher temperatures. The sectional view of FIG. 5 is placed in such a way through the ultrasonic transducer that the cooling ducts which are constructed as bores or integrated lines are visible. The cooling ducts 9 extend through the housing wall and flow around the housing part which accommodates the electronic unit 20 as well as the housing part which receives the magnet system 12, 12′, 13 and the coil system 18. Coolant flows around the circuit closing plates, as well as around the magnets and the coil system 18. The cooling ducts 9 extend past the magnets 12, 12′ and through the transducer coil support 4 and are vented in the region of the transducer coils 18 through ventilation openings 11 in the transducer coil support 4.

The cooling ducts 9 are integrated in an advantageous manner in the individual segments, i.e., the housing 2, the circuit closing plates 3, 3′, and the coil support 4, such that no additional lines must be provided and that the essentially segment-like or modular construction of the housing remains unchanged. The cooling ducts are formed by bores or recesses in the housing, in the circuit closing plates, and in the coil support. In the assembled state, the cooling ducts are directly connected to each other. In the assembled state of the ultrasonic transducer, the coolant connection 6 is connected to the remaining cooling ducts 9 through ducts 9′ which are integrated in the cover 1.

The electrodynamic ultrasonic transducer proposed in accordance with the present invention can be used universally and is suitable for material testing of hot workpieces, as well as in test plants in which there are large distances between the respective ultrasonic transducer and the central electronic control unit.

It should be understood that the preferred embodiments and examples described are for illustrative purposes only and are not to be construed as limiting the scope of the present invention which is properly delineated only in the appended claims.

We claim:

1. An electrodynamic ultrasonic transducer to be placed against a workpiece surface to be tested, said transducer comprising a housing of a non-magnetic, electrically conducting material; a magnet system mounted in the housing and extending beyond the housing toward the workpiece surface; a transducer coil system mounted below the magnet system and facing the workpiece surface, the housing having recesses in an area of the housing adjacent the magnet system, and magnetic circuit closing plates of magnetic material mounted in the recesses in contact with the magnet system such that when the transducer is placed against the workpiece surface to be tested, the circuit closing plates are in contact with the workpiece surface so that a magnetic circuit is obtained between the circuit closing plates, the workpiece surface and the magnet system.

2. The electrodynamic ultrasonic transducer according to claim 1, wherein the housing has a rectangular cross section in a plane extending parallel to the workpiece surface to be tested.

3. The electrodynamic ultrasonic transducer according to claim 2, wherein the rectangular housing has short sides and relatively longer sides, and wherein the recesses and the circuit closing plates mounted in the recesses are arranged on the short sides.

4. The electrodynamic ultrasonic transducer according to claim 3, wherein the housing has an opening extending between the circuit closing plates, and further comprising a transducer coil support of non-magnetic material replaceably mounted in the opening below the magnet system and facing the workpiece surface to be tested.

5. The electrodynamic ultrasonic transducer according to claim 1, wherein the housing has a housing portion remote from the workpiece surface to be tested, and wherein an electronic signal amplification unit is housed in the housing portion.

6. The electrodynamic ultrasonic transducer according to claim 5, wherein the housing has a housing portion for housing the magnet system, the housing having an outer region, and cooling ducts disposed in the outer region of the housing, the cooling ducts extending through the portion housing the electronic signal amplification unit as well as through the portion housing the magnet system.

7. The electrodynamic ultrasonic transducer according to claim 6, comprising a coolant connection for supplying the cooling ducts with compressed air through the housing, and at least one ventilation opening for the compressed air in the transducer coil support.

8. The electrodynamic ultrasonic transducer according to claim 1, wherein the magnet system comprises at least two permanent magnets having pole surfaces, wherein pole surfaces of equal polarity face each other, and a concentrator member mounted between the permanent magnets.

9. The electrodynamic ultrasonic transducer according to claim 8, wherein the concentrator member is removeably mounted between the permanent magnets.

10. The electrodynamic ultrasonic transducer according to claim 7, wherein the housing on the housing portion remote from the workpiece surface to be tested has a cover for closing the housing, the cover defining ducts in communication with the coolant connection and with the coolant ducts.

11. The electrodynamic ultrasonic transducer according to claim 5, wherein the electronic signal amplification unit comprises a plurality of components arranged on a plurality of levels, the housing having a cover, at least a level closest to the cover being attached to the cover, and connections for electrically connecting individual levels.

12. The electrodynamic ultrasonic transducer according to claim 4, wherein the circuit closing plates and the transducer coil support are beveled along the relatively longer sides.

13. The electrodynamic ultrasonic transducer according to claim 1, wherein said magnetic circuit closing plates are detachably mounted in said recesses.

* * * * *